United States Patent [19]

Knebl

[11] Patent Number: 5,035,905

[45] Date of Patent: Jul. 30, 1991

[54] METHODS FOR FORMING A FOLD-OVER SOFT CENTER-FILLED CONFECTION

[75] Inventor: Leslie F. Knebl, Morristown, N.J.

[73] Assignee: Warner-Lambert Company, Morris Plains, N.J.

[21] Appl. No.: 535,077

[22] Filed: Jun. 8, 1990

Related U.S. Application Data

[62] Division of Ser. No. 253,793, Oct. 4, 1988, Pat. No. 4,949,630.

[51] Int. Cl.$^5$ .............................................. A23G 00/00
[52] U.S. Cl. .................................. 426/284; 426/514; 426/516
[58] Field of Search .................... 426/284, 524, 516

[56] References Cited

U.S. PATENT DOCUMENTS

| | | | |
|---|---|---|---|
| 1,318,292 | 10/1919 | Laskey | 426/284 |
| 2,120,820 | 6/1938 | Thürlings | 426/284 |
| 2,960,045 | 11/1960 | Pentzlin | 426/284 |
| 2,976,155 | 3/1961 | Heller | 426/284 |
| 4,283,430 | 8/1981 | Doster et al. | 426/284 |
| 4,450,179 | 5/1984 | Vink et al. | 426/516 |

FOREIGN PATENT DOCUMENTS 1095453 12/1967 United Kingdom ............... 426/284

Primary Examiner—Donald E. Czaja
Assistant Examiner—Jean Aberle
Attorney, Agent, or Firm—Richard S. Bullitt; Daniel A. Scola, Jr.

[57] ABSTRACT

A method and apparatus for forming a center-filled confectionary rope having a soft candy center. The apparatus of the invention includes a forming nose over which a rectangular sheet of candy is passed to form a continuous, hollow, substantially cylindrical outer layer of candy. A frustoconical extruder attached to the lower surface of the forming nose is provided for extruding a soft candy into the hollow portion of the cylindrical outer layer of candy as it is being formed by the forming nose. The combination of candy exterior and soft candy center is then passed through a forming chute which imparts to the confectionary a desired cross-sectional geometry.

5 Claims, 2 Drawing Sheets

METHODS FOR FORMING A FOLD-OVER SOFT CENTER-FILLED CONFECTION

This is a divisional of copending application Ser. No. 253,793 filed on Oct. 4, 1988, now U.S. Pat. No. 4,949,630.

BACKGROUND

1. Field of the Invention

The present invention relates to methods and apparatus for forming a center-filled confectionary rope. More particularly, the present invention relates to methods and apparatus for extruding a soft candy mass into the center of a second candy mass, while simultaneously forming the second candy mass into a cylindrical shape.

2. The Background of the Invention

Confectionary products are available in a variety of flavors, configurations, sizes, textures, and combinations. In recent years, confectionary products having an outer layer of one flavor or type in combination with an inner layer of a second flavor or type of confection have gained popularity. For example, many companies market a chewing gum which has been injected with a sweet liquid or a soft center portion which is heavily flavored. As one chews the gum, the flavor-rich interior is released thereby providing a burst of flavor.

This same concept has been used successfully with various types of candies. Hard candy exteriors are provided with liquid interiors, soft candy interiors, or hard candy interiors of a second flavor. Additionally, similar types of candy interiors have been used successfully as center fills for flavored gum, hard candy, or soft candy, such as caramel. Thus, a wide variety of combinations of confectionary products are available which have as their basic configuration a solid exterior portion with a second portion forming a center.

Candies having a soft center are particularly well-liked. Soft centers can be covered, for example, with a gum, a hard candy, or a soft exterior. The exterior may be the same flavor as the soft center, or it may be given a second flavor, compatible with the flavor of the soft center.

Confectionary products of this nature can be made by hand by forming a long, rectangularly shaped layer to be used as the exterior. The center is then placed within the rectangularly shaped exterior in a longitudinal direction. The rectangularly shaped exterior layer is then wrapped around the center to form a center-filled confectionary "rope". The rope may then be cut into several small pieces to form individual candies, or it may be stretched and folded back onto itself several times to form a layered structure.

Although making center-filled candies by hand, as described above, is a popular hobby, making candy by hand is an inadequate method of production when large quantities of candies are needed.

When the candy is to be sold commercially, the market generally cannot easily absorb the high labor costs involved in making confectionary products by hand. As a result, candy makers have attempted to develop equipment to minimize the use of hand formation techniques in manufacturing center-filled confections. However, the manufacturing of center-filled confectionary products in a factory, using equipment which continuously manufactures such a product, gives rise to several problems not encountered under the controlled conditions available when making candy by hand.

When making candy by hand, one "batch" of candy passes through the various steps which make up the manufacturing process one step at a time. After one step is completed, the entire batch moves on to the next step. Thus, careful and continuous monitoring of the candy is possible at all times during the manufacturing process.

When making candy in a factory, it is generally preferred to utilize a continuous manufacturing process whereby the candy is made according to an assembly-line procedure. Thus, monitoring of individual batches of candy is not possible. The methods utilized in the production process must reliably produce a product of consistent quality.

Manufacturing a center-filled candy which has a soft center presents additional considerations. Because the center is soft, it can be difficult to control during the manufacturing process. Unlike a hard center, which may be formed into a specific shape and then coated with the desired exterior, a soft center is floppy and does not present a supportive structure for the exterior. For this same reason, it can also be extremely difficult to mechanically place the soft center within the exterior confection. Thus, some candy makers accomplish this step manually, while forming the remainder of the product mechanically.

One known method which is used to form a confectionary outer layer suitable for use with a soft center is to first form the outer confection into a continuous generally rectangular sheet. This continuous rectangular sheet is then passed over a folding device which causes the continuous rectangular sheet to fold over itself and take a hollow cylindrical geometry.

This "fold-over" method for making a candy exterior has been used successfully in making a center-filled candy when the center has a consistency which is also capable of being formed into a continuous rectangular sheet. Such a center-filled candy is made by placing the continuous rectangular sheet of the exterior on top of the continuous rectangular sheet which is to become the center. The combination is then passed through a folding apparatus. The apparatus causes the combination sheet to fold over itself to produce a continuous confectionary rope. With this process, one continuous rectangular sheet forms the cylindrically-shaped exterior of the rope and the second continuous rectangular sheet forms the center.

A process for making a center-filled confectionary rope as described above, however, will not work effectively for producing a candy rope with a center of soft candy which is of such a consistency that it does not lend itself well to being formed into a continuous rectangular sheet. Also, even if the soft center material could initially be coated onto the continuous rectangular sheet which forms the exterior, these same difficulties will arise if it will not maintain its position during the "fold-over" process.

The present invention overcomes the problems experienced in the art. The present invention utilizes the fold-over process described above to form the exterior portion of the candy, together with novel methods and apparatus for placing the soft center material in place.

It will be appreciated, therefore, that what is needed in the art are methods and apparatus for forming a center-filled confectionary product which has a soft candy center. It would also be an enhancement in the art if such methods and apparatus would enable such a center-filled confectionary product to be manufactured continuously, thereby enabling the methods and apparatus of the present invention to be used in combination with the equipment utilized in modern candy manufacturing facilities. It would be a further advancement in the art if such methods and apparatus could produce a center-filled confectionary product having a quality comparable or superior to the quality of similar confectionary products made by hand. It would be an additional enhancement in the art if such methods and apparatus would produce a center-filled confectionary product more economically than those methods and apparatus presently utilized by the prior art.

Such methods and apparatus are disclosed and claimed herein.

BRIEF SUMMARY AND OBJECTS OF THE INVENTION

The present invention includes novel methods and apparatus for producing a center-filled confectionary rope with a soft confectionary center. The invention employs a frustoconical shaped extruder through which a soft confectionary material is extruded. Using the present invention, the extruded soft center can be placed directly within the center of an outer layer of candy. In one preferred embodiment, the soft center is laced within the outer layer as the outer layer of candy is formed into a hollow cylindrical shape.

Initially a confectionary material suitable for forming the exterior layer is obtained. This material is then formed into a continuous rectangularly-shaped layer. The continuous rectangular outer layer is capable of being folded over itself to form a hollow cylinder.

At the same time, a soft center material which is capable of being extruded is obtained. Employing the present invention, the soft center material is extruded through a generally frustoconical shaped extruder, which in turn directs the material in a desired direction, such as into the hollow center of the cylinder formed by the exterior material.

In a preferred embodiment of the present invention, the outer layer begins to be folded over onto itself. The soft center is simultaneously extruded into the area being enclosed by the folding of the outer layer. Thus, as the folding is completed the soft material is secured within the center of the outer layer, which now exists in the form of a cylinder. Because the rate at which the soft candy center is extruded into the hollow cylinder can be carefully controlled in a continuous manufacturing process, the quality of the resulting candy rope is superior and more consistent than that found in candy ropes produced by other methods.

For the present invention, a generally frustoconical extruder is employed to extrude the soft center material. The frustoconical extruder of the present invention is configured such that the resulting continuous extruded stream of soft confection produced by the extruder is of a diameter sufficient to completely fill the hollow cylinder of the exterior candy covering. During the manufacturing process, the frustoconical extruder is placed in a position adjacent the folding apparatus which causes the exterior layer of candy to fold over itself. This allows the soft center to be placed within the candy as the exterior is being formed into a hollow cylinder.

It is, therefore, a primary object of the present invention to provide methods and apparatus for manufacturing a center-filled confectionary rope which contains a soft center.

It is a further object of the present invention to provide methods and apparatus for producing a center-filled confectionary rope which operate in a continuous manner, thereby enabling large quantities of the confectionary rope to be produced, and further enabling the present invention to be used in combination with modern, continuously operating manufacturing equipment.

It is a further object of the present invention to provide such methods and apparatus which will produce a center-filled confectionary rope with a soft center having a quality which is better and more consistent than that which is found in confectionary ropes made by hand.

It is an additional object of the present invention to provide such methods and apparatus which are more economical than those methods and apparatus employed by the prior art.

The novel features of this invention, as well as the invention itself, both as to its structure and its operation, will be best understood from the accompanying drawings, taken in conjunction with the accompanying description, in which similar reference characters refer to similar parts, and in which:

DETAILED DESCRIPTION OF THE PREFERRED EMBODIMENTS

Figure 1:
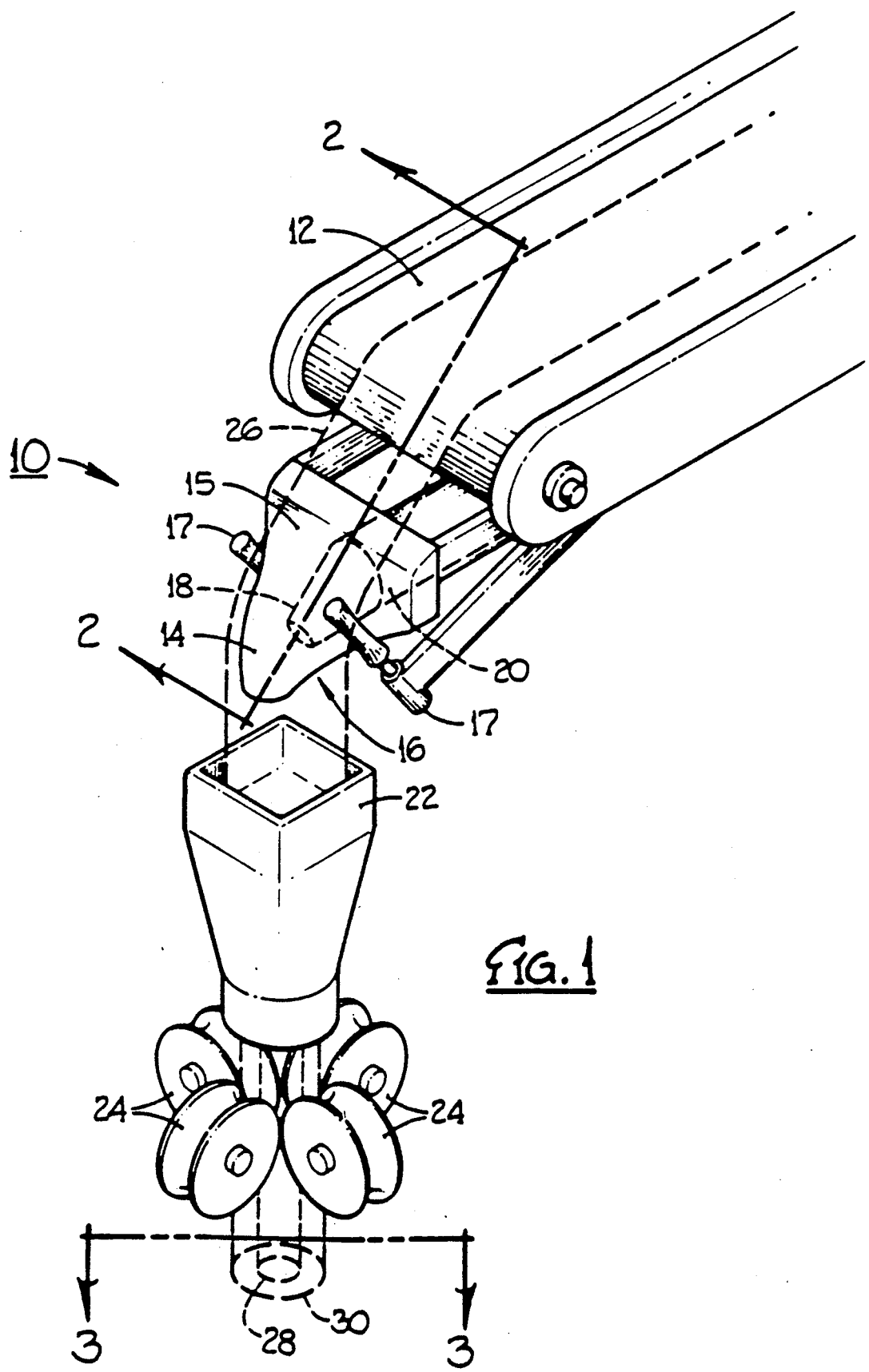
FIG. 1 is a perspective view of the apparatus of the present invention, with phantom lines indicating the position of the candy layers.

Reference is now made to the drawings wherein like parts are designated with like numerals throughout. The present invention is directed to methods and apparatus for manufacturing a center-filled confectionary rope in which the center is a soft candy. FIG. 1 illustrates the apparatus of the present invention. The fold-over apparatus of the present invention is illustrated generally as 10.

The fold-over apparatus 10 includes a conveyor belt 12. As will be explained in further detail below, the conveyor belt 12 carries the exterior layer of candy from a previous step in the manufacturing process wherein the exterior layer is formed into a continuous rectangular shape.

Attached to the end of the conveyor belt 12 is a forming nose 14 which has an upper surface 15 and a lower surface 16. The forming nose 14 acts in combination with the conveyor belt 12 to form the outer layer of candy into a generally cylindrical shape which will eventually become the outer layer of the center-filled confectionary rope produced by the present invention. As intended by the present invention, when the exterior layer leaves the end of the conveyor belt 12, it falls over the upper surface 15 of the forming nose 14 which in turn causes the exterior candy layer to take on a cylindrical configuration. Guiding arms 17 are also provided on each side of the forming nose 14 to maintain proper alignment of the candy product as it travels over the forming nose 14.

Figure 2:
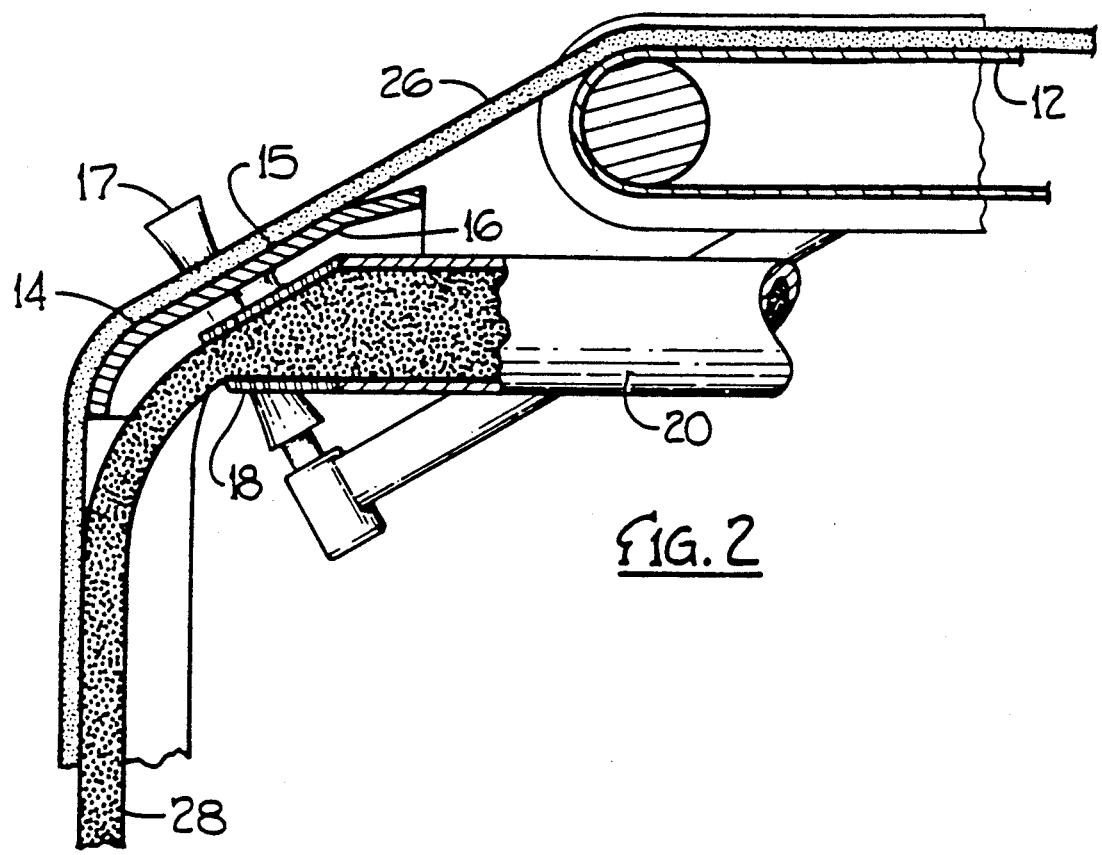
FIG. 2 is a side cross-sectional view of the apparatus of the present invention as seen along the line 2—2 in FIG. 1.

As best seen in FIG. 2, a generally frustoconical extruder 18 is shown as attached to the lower surface 16 of the forming nose 14. This attachment may be by any means well known in the art, such as by welding. It is to be appreciated, that the soft candy center is extruded through the frustoconical extruder 18 into the cylindrically-shaped candy exterior, while the exterior is being formed into the cylindrical shape. While a generally frustoconical extruder is illustrated in FIG. 2, it will be appreciated that the extruder may take on a variety of configurations. It is only necessary that the soft center material be shaped by the extruder such that it fits within and generally fills the interior of the exterior layer.

Although illustrated as attached to the lower surface 16 of the forming nose 14, it will also be appreciated that the frustoconical extruder 18 may be placed in any spaced relationship with the forming nose 14 such that its function of providing a soft candy interior within the exterior shaped by the forming nose 14 is accomplished.

A feed tube 20 is connected to the large end of the extruder 18. It is through the feed tube 20 that the soft candy interior is pumped from a soft candy source (not shown) to the extruder 18. The feed tube 20 may be replaced with any type of device which will provide a continuous flow of soft candy interior to the frustoconical extruder 18.

As seen in FIG. 1, a forming chute 22 is placed below the extruder 18 such that as the confection exterior is formed by the forming nose 14 and filled with the soft center provided through the extruder 18, the resulting combination passes through the forming chute 22 to refine the geometry of the candy rope into a cylindrical shape.

At the point that the forming chute 22 terminates, the product is passed into a set of four rollers 24, each having a quarter circular concave geometry. The rollers 24 are placed at the base of the forming chute 22 perpendicular to one another such that as the candy rope passes between the rollers 24, the rollers, acting in combination with one another, provide a circular cross-sectional geometry to the candy rope. Thus, the function of the rollers 24 is to further refine the shape of the candy rope after it has passed over the forming nose 14. If a geometry other than a circular one is desired, the rollers 24 may be configured such that the desired geometry is obtained. Alternatively, it may be desirable in some cases to eliminate the rollers 24.

The candy which is to form the exterior of the confectionary rope is generally initially formed into a continuous rectangular sheet as illustrated at 26 in FIG. 1. The use of the term "continuous" is intended to reflect modern manufacturing techniques in which a confectionary product of this nature is manufactured without any interruption of the manufacturing process. This is in contrast to a process whereby candies are made in a piecemeal operation that handles one "batch" of candy at a time. Thus, the present invention is designed for use in modern manufacturing facilities where the processes and machines which transform initial ingredients into a final product are continuously in operation. It will be appreciated, however, that the methods of the present invention will also work effectively in systems in which only one "batch" of a product is prepared at a time.

In accordance with the present invention, the continuous rectangularly-shaped exterior layer 26 has a thickness which is equivalent to, or slightly less than, the thickness of exterior layer desired for the resulting candy rope. The width of the rectangular layer 26 is approximately equivalent to, or slightly greater than, the circumference of the layer after it has been molded into the cylindrical geometry. Although the length may be virtually any size, as mentioned above, it is generally referred to herein as being "continuous" because of the continuous nature of the preferred manufacturing process. The layer 26 must have sufficient length, however, to be capable of being fed along the conveyor belt 12 and over the forming nose 14 into the forming chute 22.

As shown in both FIGS. 1 and 2, after the exterior layer 26 has been formed into a continuous rectangularly-shaped layer as described above, it is carried by the conveyor belt 12 and allowed to "fall" off the end of the conveyor belt onto the upper surface 15 of the forming nose 14. The guiding arms 17 align the rectangular sheet 26 of candy with respect to the forming nose 14 such that the rectangular sheet 26 is centered over the forming nose 14 as it exits the conveyor belt 12. As the exterior layer 26 falls over the upper surface of the forming nose 14, the nose 14 only provides support for the center portion of the layer 26, thereby allowing the force of gravity to cause the exterior edges of the layer to "fold" over the center portion. Thus, as the exterior layer 26 passes over the forming nose 14, it is formed into a substantially hollow cylindrical shape.

As the exterior layer 26 is being formed into the hollow cylindrical shape, a soft confectionary center 28 is extruded through the frustoconical extruder 18 and into the cylinder created by the exterior layer. As used herein, "soft" confection refers to any candy which, during the manufacturing process described, is capable of being extruded. Thus, as the exterior layer 26 enters the forming chute 22, it is generally completely filled with the soft candy interior 28.

The rate at which the soft confectionary center 28 is extruded into the exterior cylinder 26 is governed by the rate at which the exterior cylinder is flowing through the system. The soft confectionary center 28 should flow into the exterior layer 26 at a sufficient rate that the hollow cylindrical exterior layer is filled to a predetermined extent with the soft candy center 28. If the flow rate of the soft confectionary center 28 is too slow, undesirable void spaces may appear within the center of the confectionary rope. If the flow rate is too fast, excess confectionary will build up on the extruder causing possible overflow and inconsistency in the quality of the resulting confectionary product.

As shown in FIG. 1, after the confectionary exterior 26 has been filled with the soft confectionary center 28, the combination flows through the forming chute 22. The rollers 24 on the forming chute 22 serve to refine the geometry of the confectionary rope, imparting to the rope a circular geometry. As mentioned previously, however, confectionary ropes of various geometrical configurations may be formed at this stage using rollers of a different shape.

Figure 3:
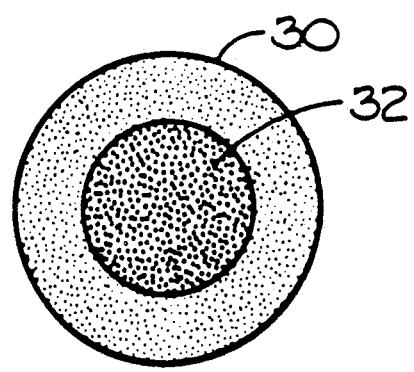
FIG. 3 is a cross-sectional view of the candy rope as seen along the line 3—3 in FIG. 1 illustrating the center-filled confectionary rope manufactured according to the present invention.

FIG. 3 illustrates the cross-section of the confectionary rope after it has been formed into a cylindrical geometry by the rollers 24. The exterior layer of candy 30 completely encloses the soft candy center 32. As can be easily appreciated, after the confectionary rope has been formed, it may be cut into individual pieces for packaging.

From the foregoing, it will be appreciated that the present invention provides unique apparatus and methods for manufacturing a confectionary rope containing a soft candy center. This is achieved by forming an outer layer of confectionary mass into a continuous rectangular shape and then folding it over itself to form a substantially hollow cylinder while simultaneously extruding a soft confectionary center within the center of the outer layer.

In addition, the present invention provides a method and apparatus for the manufacture of a center-filled confectionary rope in a continuous manner, thereby enabling the methods of the present invention to be used in combination with modern manufacturing facilities. The conveyor belt enables a continuous supply of the continuous rectangular shaped exterior to be delivered to the forming nose. Additionally, a continuous supply of the soft candy center is also supplied thereby enabling the center-filled confectionary rope to be produced continuously.

Using the methods and apparatus of the present invention, the flow rate of soft candy center into the candy exterior may be maintained at a constant level thereby ensuring that the center-filled confectionary rope manufactured by the present invention is of a higher and more consistent quality than those confectionary ropes conventionally produced by other existing techniques.

Finally, the methods and apparatus of the present invention enable large quantities of center-filled confectionary rope to be produced more economically than by employing those methods and apparatus utilized the prior art. Because the manufacturing process of the present invention may be completely mechanized and is capable of operating on a continuous basis, it requires minimal operation supervision and thereby greatly reduces labor costs associated with the production of such confectionary products.

It will be appreciated that the apparatus and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

What is claimed and desired to be Secured by U.S. Letters Patent is:

1. A process for forming a center-filled confectionery rope, comprising the steps of:
   providing an outer layer of a confectionery mass as a continuous rectangular sheet by delivery on a substantially planar delivery mass;
   forming the outer layer of confectionery mass from said continuous rectangular sheet into a continuous hollow cylinder in the absence of deforming said delivery means;
   providing a soft confectionery mass; and
   extruding a continuous flow of the soft confectionery mass into the hollow center of the cylinder during the formation of the cylinder.

2. A process for forming a center-filled confectionery rope as defined in claim 1, further comprising the step of imparting to the confectionary rope a cross-sectional geometry by passing the rope through a plurality of rollers.

3. A process for forming a center-filled confectionery rope as defined in claim 2, wherein the step of imparting to the confectionary rope of a cross-sectional geometry comprises imparting a cylindrical cross-sectional geometry to the confectionary rope.

4. A process for forming a center-filled confectionery rope as defined in claim 2, wherein the step of imparting to the confectionary rope a cross-sectional geometry is preceded by directing the confectionary rope into a plurality of rollers.

5. A process for forming a center-filled confectionery rope as defined in claim 1, further comprising the step of aligning the rectangular sheet of confectionery mass as it passes over a forming nose.

* * * * *